US007264461B2

(12) United States Patent
Ouellette

(10) Patent No.: US 7,264,461 B2
(45) Date of Patent: Sep. 4, 2007

(54) EXTERNALLY ADJUSTABLE INSERT FOR EXTRUSION MANIFOLD

(75) Inventor: Edward Leon Ouellette, Corinth, TX (US)

(73) Assignee: Frito-Lay North America, Inc., Plano, TX (US)

( * ) Notice: Subject to any disclaimer, the term of this patent is extended or adjusted under 35 U.S.C. 154(b) by 70 days.

(21) Appl. No.: 11/250,874

(22) Filed: Oct. 14, 2005

(65) Prior Publication Data

US 2007/0087070 A1 Apr. 19, 2007

(51) Int. Cl.
*B29C 47/16* (2006.01)

(52) U.S. Cl. ...................... 425/381; 425/190; 425/311; 425/313; 425/466

(58) Field of Classification Search ................ 425/466, 425/190, 381, 311, 313
See application file for complete search history.

(56) References Cited

U.S. PATENT DOCUMENTS 2,365,482 A * 12/1944 Manken et al. ............. 425/140
4,732,770 A 3/1988 Welygram et al.
5,840,359 A 11/1998 Lechthaler et al.
6,206,678 B1 * 3/2001 Keehn et al. ............... 425/308
6,533,973 B1 3/2003 Franke et al.
6,830,444 B2 12/2004 Franke et al.

FOREIGN PATENT DOCUMENTS

| | | |
|---|---|---|
| EP | 86303830 | 1/1994 |
| WO | WO 95/16553 | 7/1995 |
| WO | WO 99/44806 | 9/1999 |

* cited by examiner

*Primary Examiner*—Tim Heitbrink
*Assistant Examiner*—Marissa W. Chaet
(74) *Attorney, Agent, or Firm*—Carstens & Cahoon, LLP; Colin P. Cahoon; Chad E. Walter

(57) ABSTRACT

Externally adjustable extrusion insert for a multiple-orifice extrusion manifold. Adjustments to an extrusion insert precisely controls the extrusion path leading to one or more extrusion orifices of the manifold. Each insert is adjusted to reduce or eliminate variations in extrudate exit velocity among orifices in the extrusion manifold. Precisely tuned inserts provide extruded products of uniform length. Choke plates controlling the flow of extrudate to each orifice. Choke plates are manipulated with an externally adjustable cam. Such adjustment compensates for variations in temperature, pressure, surface properties, geometric variations, and other conditions which may affect extrudate flow rates through the orifices and extrusion manifold.

5 Claims, 3 Drawing Sheets

EXTERNALLY ADJUSTABLE INSERT FOR EXTRUSION MANIFOLD

BACKGROUND

1. Technical Field

This invention relates to an apparatus for providing a uniform feed rate from each of a plurality of extrusion orifices distributed around a circular extrusion manifold. More particularly, the invention relates to a set of cams mounted on a shaft which controls the size and shape of a set of extrusion orifices to compensate for feed rate variations.

2. Description of Related Art

When extruding masa, dough or other food product, there are often temperature and pressure variations over the cross-section of flowing extrudate as the extrudate approaches and exits extruder orifices. Such variations are especially prevalent with the use of an extruder manifold over which a plurality of extruder orifices is arranged. Additionally, variations in geometry and surface finishing contribute to non-uniform flow. Such variations cause extrudate exit velocity variations among the various extruder orifices which in turn yields product of varying length as product is extruded and cut from the orifices.

A frontal view of a typical prior art multiple-orifice extrusion manifold is shown in FIG. 1A. With reference to FIG. 1A, a cutting blade 108 rotates at a constant speed around a central axis 106 of a circular extrusion manifold 110. The cutting blade 108 cuts extrudate (not shown) as it exits pairs 102 of extrudate orifices 104 which form part of the extrusion manifold 110. Such a cutting blade or blades may make as many as 100 strokes per minute. As extrudate is pumped through the extrusion manifold 110, the velocity of extrudate exiting a top pair of extrusion orifices 120 may differ from the velocity of extrudate exiting a central pair 122 or bottom pair 124 of extrusion orifices. This difference is accentuated by the relatively high extrudate pressure necessary to pump the comestible extrudate through such an extrusion manifold 110, usually in the range from about 400 to 500 psi (2.7 to 3.4 MPa). The pressure drop across such a manifold 110 is usually in the range of 300 to 350 psi (2.0 to 2.4 MPa). As the extrudate is cut, the resulting pieces of extrudate vary in length in direct proportion to the variation in exit extrusion velocity. The result is product of varying lengths. However, for many applications, it is desirable to have a relatively uniform length of extrusion product.

A cross-sectional view of the extrusion manifold of FIG. 1A is shown in FIG. 1B. With reference to FIG. 1B, as extrudate (not shown) enters a flow path 114 leading to pairs 102 of individual orifices 104, variations in geometry, surface characteristics, pressure and temperature cause the linear flow to be non-uniform in portions of the flow path 114 around the central axis 106 despite great care of manufacturers to provide uniform paths to individual extrusion orifices 104.

According to the prior art, one method of adjusting for these differences is to stop the flow of extrudate, disassemble the manifold 110, and make adjustments to the size of the particular flow path 114 to various regions around the central axis 106 and to individual orifices 104. This is time consuming, iterative and imprecise. There exists a need for an improved device to individually adjust extrusion orifices to account for local variations in extrudate flow velocity. A need exists to compensate for varying temperature, pressure and velocity profiles in an extrudate flow up to and through extrusion openings. There exists a need to more accurately and quickly adjust the linear flow of extrudate through sets, pairs and individual orifices. The present invention fills these and other needs as detailed more fully below.

SUMMARY OF THE INVENTION

The object of the present invention is to provide a uniform extrudate exit velocity from each of a plurality of orifices mounted in a multiple-orifice extrusion manifold. A uniform extrudate exit velocity at each orifice, or pair or set of orifices, is obtained through adjustments to a cam which in turn slideably adjusts choke plates to control the size of each flow path leading to each orifice or set of orifices. Individual adjustment provides a uniform length of extrudate product as the product is cut at the exit of each orifice in the extrusion manifold. Such adjustment compensates for variations in temperature, pressure, surface properties, geometric variations, and other conditions which may affect extrudate flow rates through the orifices and extrusion manifold.

The invention accordingly comprises the features described more fully below, and the scope of the invention will be indicated in the claims. Further objects of the present invention will become apparent in the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

REFERENCE NUMERALS

102 set of extruder orifices

104 individual extrudate orifice

Figure 1A:
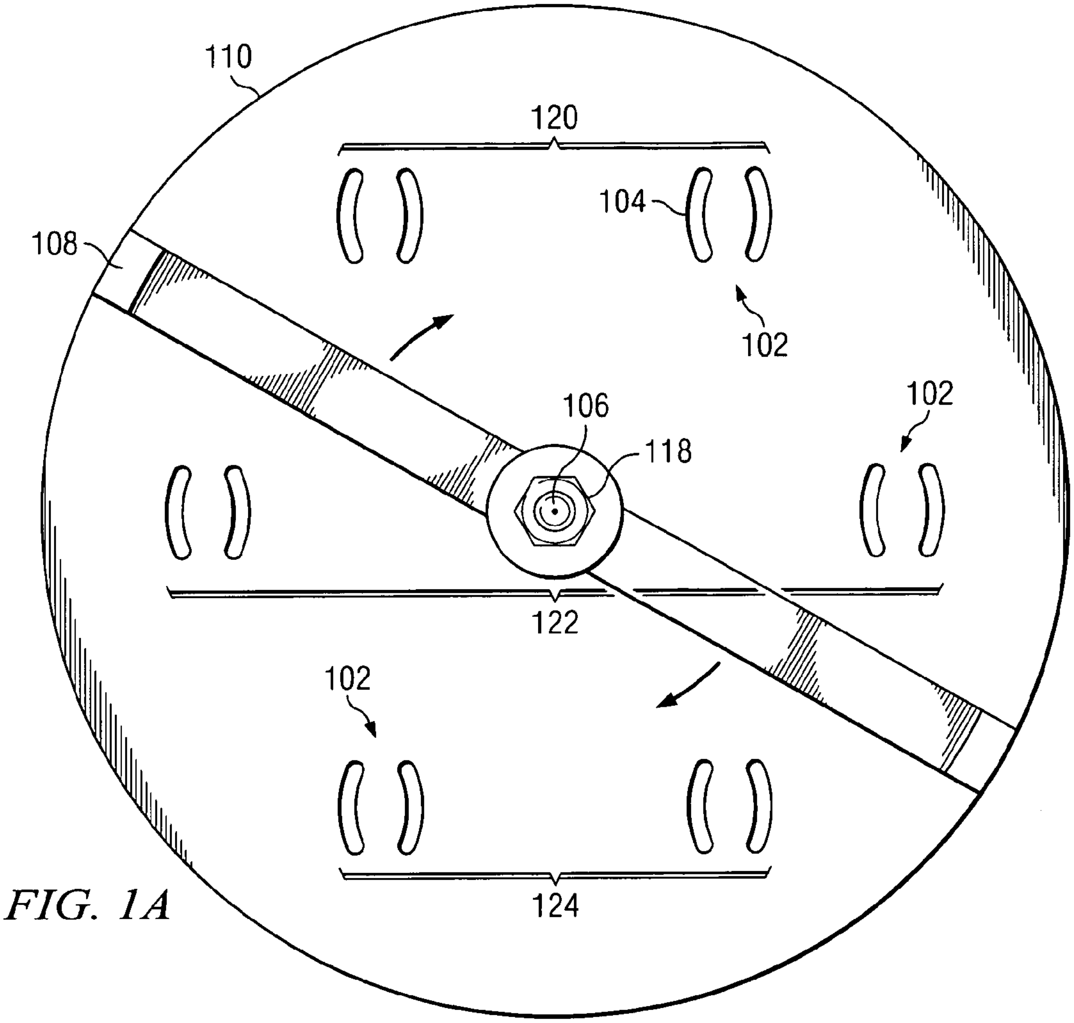
FIG. 1A is a frontal view of a multiple-orifice extrusion manifold wherein there is a multiple pairs of orifices circularly arranged around the manifold's centerline according to the prior art.
Figure 1B:
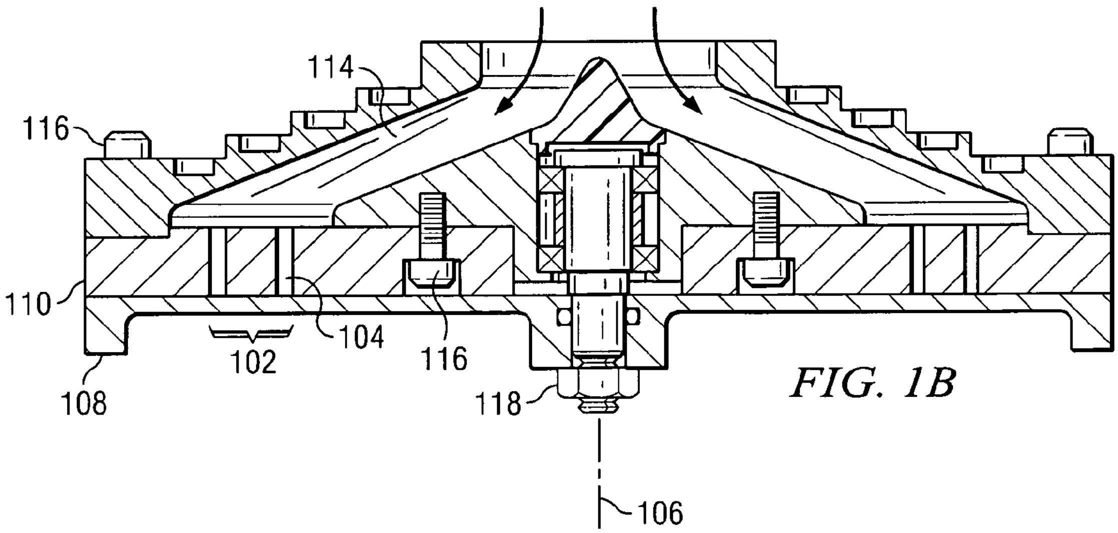
FIG. 1B is a cross-sectional view of the multiple-orifice extrusion manifold shown in FIG. 1A wherein is shown the flow path of extrudate through the manifold and orifices according to the prior art.

106 center axis of extrusion manifold
108 cutting blade
110 circular extrusion manifold
114 extrudate flow path
116 manifold screw
118 threaded nut assembly of cutting blade
120 upper set of extrusion orifices
122 middle set of extrusion orifices
124 lower set of extrusion orifices
202 externally adjustable extrusion insert
210 improved manifold
302 cam for adjusting position of choke plates
304 first choke plate
306 second choke plate
308 extrudate flow path
310 front plate of externally adjustable manifold insert
312 fitting contour of externally adjustable manifold insert

DETAILED DESCRIPTION

While the invention is described below with respect to a preferred embodiment, other embodiments are possible. The concepts disclosed herein apply equally to other apparatuses which provide uniformity of extrudate velocity and flow rate from a plurality of orifices mounted in a manifold. The invention is described below with reference to the accompanying figures.

Figure 2:
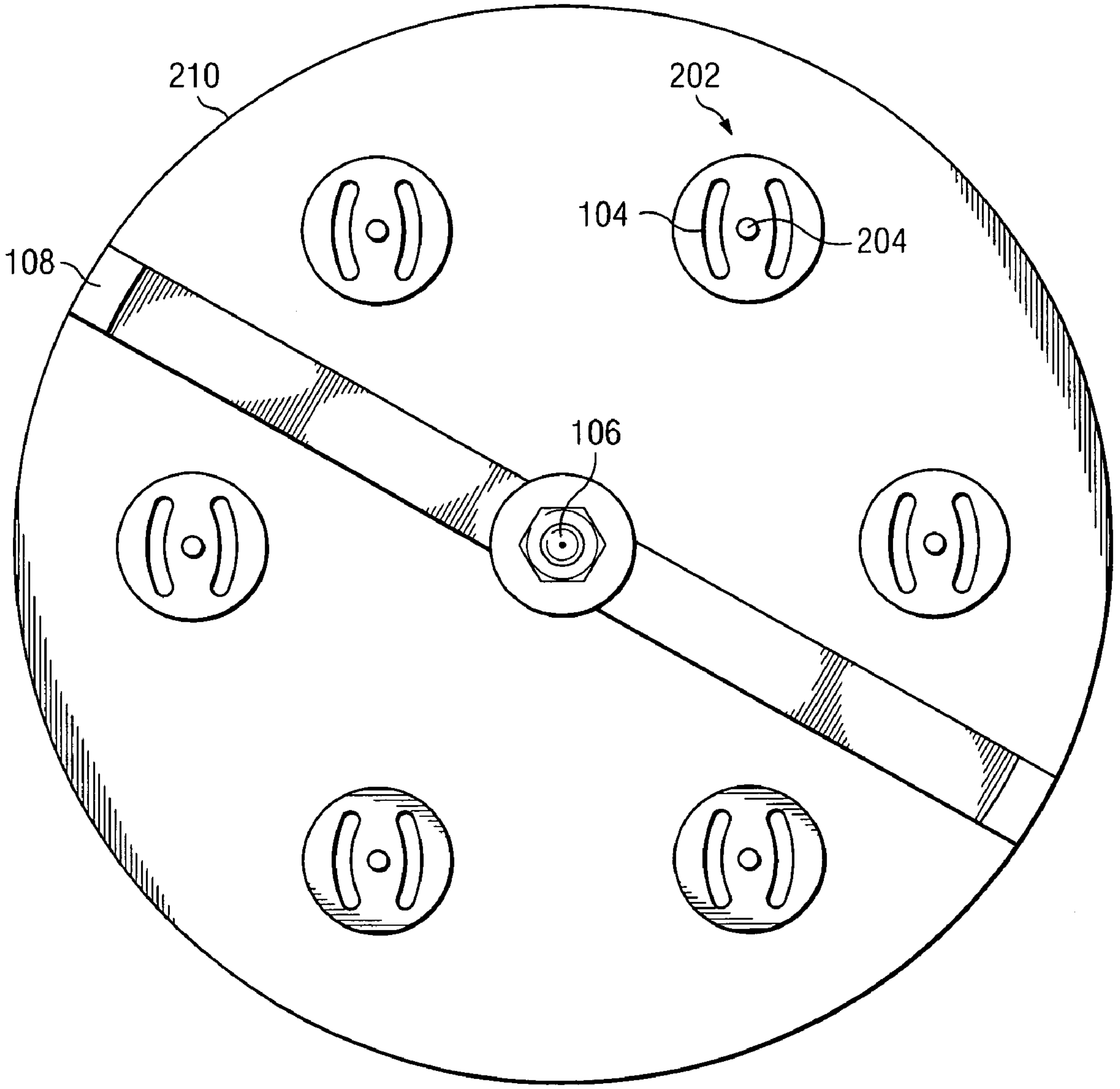
FIG. 2 is a frontal view of a multiple-orifice extrusion manifold in which is assembled multiple extrusion inserts each having adjustable choke plates which allow for individual adjustment and control of extrudate exit velocity according to the present invention.

FIG. 2 shows a front view of one embodiment of an improved circular extrusion manifold having multiple externally adjustable extrusion inserts. With reference to FIG. 2, an improved circular extrusion manifold 210 has a plurality of externally adjustable manifold inserts 202. Each insert 202 has at least one extrusion opening or extrusion orifice 104. Extrudate pieces (not shown) leaving each orifice 104 are generated by a cutting blade 108 turning in circular path around a center axis 106. The cutting blade 108 cleaves the extrudate at the discharge face of the extrusion manifold 210. In a preferred embodiment, a rotatable cutting blade 108 is used. A circular extrusion manifold 210 and a rotatable cutting blade 108 are used because they are capable of cutting extrudate at a sufficient speed to provide economic quantities of extruded product. Other configurations of extrusion manifold 210 and cutting blade 108 are possible. However, a circular cutting mechanism is faster than a reciprocating cutter.

With reference to FIG. 2, externally adjustable manifold inserts 202 provide an external adjustment mechanism 204 for each orifice or set of orifices. In one embodiment, such external adjustment mechanism 204 is a cam with an externally accessible, recessed hexagonal allen type screw head. Other embodiments of an adjustment mechanism for the cam are possible.

An improved extrusion manifold 210, with easily accessible externally adjustable extrusion inserts 202, is ideally placed above a conveyor or fryer (not shown) so that extrudate pieces, once cut, fall free from the extrusion manifold 210. The manifold may be oriented in any direction including in a vertical orientation, or in a horizontal orientation with the discharge face oriented downward. During operation, an operator monitors the length of extrudate leaving each extrusion orifice 104. This may be accomplished by various means including a camera device attached to a computer which then processes and displays the lengths of extrudate leaving each orifice 104 or set of orifices 202. Variations in extrudate exit velocity, and corresponding variations in length of extrudate pieces, among the various externally adjustable extrusion inserts 202 may be reduced and eliminated by finely adjusting the external mechanism 204 on each insert 202. Such adjustments are made until most or all variations are eliminated. Such adjustments can be easily made by momentarily stopping the cutter and flow of extrudate, making adjustments to one or more externally adjustable extrusion inserts 202, re-starting the cutter and flow of extrudate, and monitoring the change in the lengths of exiting extrudate pieces.

Figure 3A:
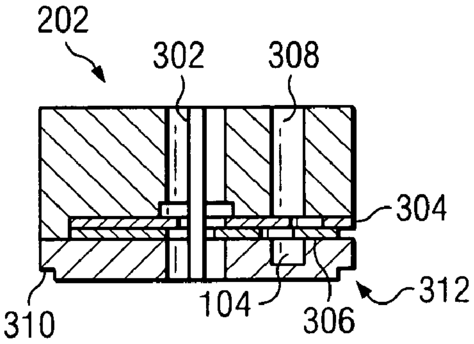
FIG. 3A is a cross-sectional view of one set of extrudate orifices showing one embodiment of the sliding choke plates which provide adjustment of orifice size for each set of orifices according to the present invention.

FIG. 3A shows a cross-section view of a portion of one embodiment of an externally adjustable extrusion insert 202 shown in FIG. 2. FIG. 3A is an overhead view of section A-A as shown in FIG. 3B. With reference to FIG. 3A, an externally adjustable extrusion insert 202 is comprised of a centrally located cam 302 which slideably controls the position of a first choke plate 304 and a second choke plate 306. A front plate 310 defines the size of the extrusion orifice 104 and provides stability to the choke plates 304, 306. The front plate 310 may have one or more fitting contours 312 which allow the extrusion insert 202 to rest securely in the extrusion manifold (not shown).

With reference to FIG. 3A, the choke plates 304, 306 are adjustable horizontally, thus restricting the size of the extrudate flow path 308 and controlling the flow of extrudate through the extrudate flow path 308. The extrudate exit velocity of the extrusion orifice 104 is thereby manipulated.

FIG. 3B shows a frontal view of an externally adjustable extrusion insert 202. With reference to FIG. 3B, this view of an extrusion insert 202 shows a set of choke plates 304, 306. Extrudate openings 316 in each choke plate 304, 306 are aligned. When these extrudate openings 316 are aligned, a circular hole 314 in each choke plate 304, 306 are offset from the rotating center line of the cam 302. The circular hole 314 in each choke plate 304, 306 accept the cam 302 shown in FIG. 3A. In this view, a first choke plate 304 lies under and slightly to the left of a second choke plate 306. This arrangement is a fully open position of the choke plates 304, 306 in operation. As the cam 302 is rotated 180 degrees, the choke plate 304 shifts to the right while, simultaneously, choke plate 306 shifts to the left. The result is that the flow area 308 is reduced to the full choke position. The flow area 308 is fully adjustable between the full open and full choke positions so as to control the flow of extrudate to the die opening 104.

Figure 3C:
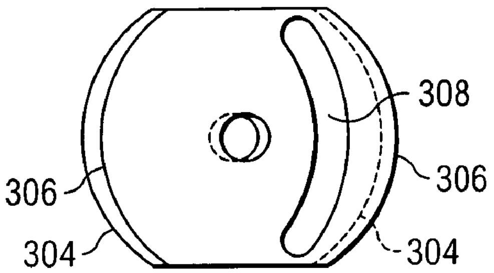
FIG. 3C is a frontal view of one set of extrudate orifices showing the sliding choke plates in a fully open position in which the orifices are not constricted according to one embodiment of the present invention; and, FIG. 3D is a frontal view of one set of extrudate orifices similar to that shown in FIG. 3C showing the sliding choke plates in a maximally choked position according to one embodiment of the present invention.
Figure 3B:
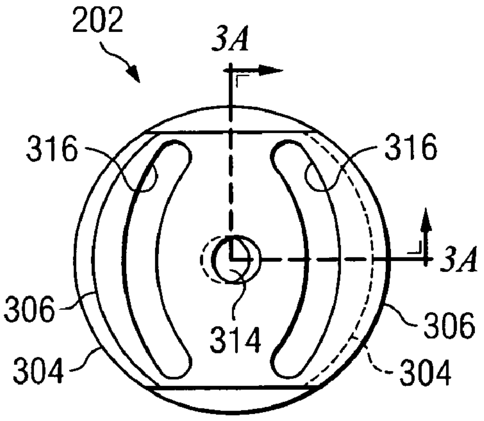
FIG. 3B is an overhead view of one section of the set of extrudate orifices shown in FIG. 2A showing one embodiment of the sliding choke plates according to the present invention.
Figure 3D:
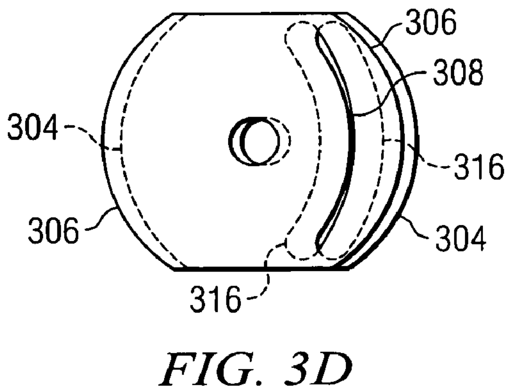

FIG. 3C is a frontal view of these choke plates 304, 306 in a fully open position and shows a fully open extrudate flow path through the choke plates 304, 306. FIG. 3D is a similar frontal view of these choke plates 304, 306 in a fully choked position and shows a substantially restricted extrudate flow path through the choke plates 304, 306. Changes in the positions of these choke plates 304, 306 are between these two extremes.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted.

I claim:

1. A manifold for extruding edible dough having at face, said manifold comprising:

a plurality of removable externally adjustable extrusion inserts wherein each insert further comprises:

a cam which is accessible from the face of the manifold;

at least one choke plate mechanically moveable by said cam; and, an insert face plate which forms part of the face of the manifold and has at least one exit orifice.

2. The manifold of claim 1 wherein the manifold is circular.

3. The manifold of claim 2 further comprising a circular cutting blade which turns and cuts extrudate leaving from the at least one exit orifice.

4. The manifold of claim 1 wherein the face plate of the extrusion insert has a fitting contour for interlocking with the manifold.

5. A manifold for extruding edible dough having at face and comprising at least one removable externally adjustable extrusion insert wherein each insert comprises:

(a) a cam which is accessible from the face of the manifold, wherein the cam is adjustable by a common hand tool such as an allen wrench;

(b) at least one choke plate mechanically moveable by said cam; and, (c) an insert face plate which forms part of the face of the manifold and has at least one exit orifice.

* * * * *

UNITED STATES PATENT AND TRADEMARK OFFICE

CERTIFICATE OF CORRECTION

PATENT NO. : 7,264,461 B2

APPLICATION NO. : 11/250874

DATED : September 4, 2007

INVENTOR(S) : Edward Leon Ouellette

It is certified that error appears in the above-identified patent and that said Letters Patent is hereby corrected as shown below:

On the title page under item 57 change 5 claims to read 6 claims.

Column 5, line 1, claim 1, should read:

1. A manifold for extruding edible dough having a face, said manifold comprising:

Column 6, line 14 insert claim 6:

--6. A manifold for extruding edible dough having a face and comprising at least one removeable externally adjustable extrusion insert wherein each insert comprises:--

Signed and Sealed this

Fifteenth Day of September, 2009

David J. Kappos

*Director of the United States Patent and Trademark Office*